United States Patent Office.

DEAN C. GOULD, OF STERLING, ILLINOIS, ASSIGNOR TO HIMSELF, ELIZABETH A. McCARTNEY, AND EPHRAIM F. BROCK.

Letters Patent No. 69,796, dated October 15, 1867.

IMPROVED MEDICAL COMPOUND.

*The Schedule referred to in these Letters Patent and making part of the same.*

TO ALL WHOM IT MAY CONCERN:

Be it known that I, DEAN C. GOULD, of Sterling, Whitesides county, Illinois, have invented or discovered a new and useful Composition of Matter; and the following is a full, clear, and exact description of the same, sufficient to enable any one skilled in the art to make and use the same.

The object of my invention or discovery is to provide an efficient and safe remedy for cholera and similar diseases, and I find by actual use that the composition of matter hereinafter described does accomplish the said object.

In making my composition of matter I use the following-named substances, and in the proportions specified, viz: Creosote, one ounce; sulphuric acid, one ounce; tincture of opium, two ounces; tincture of kino, four ounces; sulphuric ether, one ounce.

These articles are to be compounded in the order in which they are above mentioned. I first pour into a suitable vessel of glass the desired quantity of creosote, then add the proper quantity of sulphuric acid, and thoroughly mix these two; then I add the next article in order, and mix thoroughly, and continue the process until the five articles mentioned are compounded. I then allow the mixture to stand ten minutes, and then pour the whole into four pounds of water, or add four pounds of water to the mixture, as most convenient. After the mixture and the water have been thoroughly combined, by shaking or stirring, the composition is ready for use, and may be put into bottles of any desired size.

In use, I give in cases of cholera, to an adult, as a dose, one teaspoonful of the mixture, prepared as above, in two ounces of water, once every half hour till checked. In cases of vomiting I give a like dose once in fifteen minutes. The same remedy is efficient for and will cure diarrhœa and cholera morbus. For children the dose must be graduated according to age.

The nature of the several articles used in this composition is well known to the medical profession; I will therefore make only a brief statement of the operation of the composition. It is well known that in cholera the watery portions of the blood are by some subtle poison separated from the solid portions, and this separation must be arrested to effect a cure. The effect of the sulphuric acid is to destroy the said poison and arrest the separation of the watery from the solid portions of the blood. The creosote acts as a nervous sedative, but not as a narcotic, while the opium quiets nervous action. The kino acts as an astringent on the enlarged blood corpuscles, and the sulphuric ether acts as an anti-spasmodic and stimulant. I use but a small quantity of sulphuric ether, because the union of the sulphuric acid with the tinctures develops or forms sulphuric ether.

I have above given the use in general terms of the several articles used. In compounding them there is strong chemical action, and I do not claim to know exactly how the compound operates in all particulars.

Water is not an essential element of my compound, but is used for the purpose of reducing it to proper strength. The water may be omitted in preparing the compound, or the quantity varied, provided that when administered it be made of proper strength. I consider the proportions of the articles used, above stated, the best, though the efficiency of the compound will not be materially affected by a slight change of proportions.

Having thus fully described my invention or discovery, what I claim, and desire to secure by Letters Patent, is—

A medical compound composed of creosote, sulphuric acid, tincture of opium, tincture of kino, and sulphuric ether, combined and prepared substantially as specified.

D. C. GOULD.

Witnesses:
   J. S. STAGER,
   D. BARD ROCK.